(12) United States Patent
Rockwell

(10) Patent No.: US 6,327,063 B1
(45) Date of Patent: Dec. 4, 2001

(54) RECONFIGURABLE LASER COMMUNICATIONS TERMINAL

(75) Inventor: David A. Rockwell, Culver City, CA (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/165,811

(22) Filed: Oct. 2, 1998

(51) Int. Cl.$^7$ .................................................. H04B 10/00
(52) U.S. Cl. ............................ 359/172; 359/153; 359/156
(58) Field of Search .................................. 359/122, 124, 359/127, 156, 159, 172, 114, 153

(56) References Cited

U.S. PATENT DOCUMENTS

| | | | |
|---|---|---|---|
| 5,062,150 | * 10/1991 | Swanson | 359/152 |
| 5,218,467 | 6/1993 | Ross et al. | 359/172 |
| 5,347,387 | 9/1994 | Rice et al. | 359/152 |
| 5,552,920 | * 9/1996 | Glynn | 359/172 |
| 5,659,412 | * 8/1997 | Hakki | 359/156 |
| 5,659,413 | 8/1997 | Carlson | 359/172 |
| 5,923,452 | 7/1999 | Carlson et al. | 359/172 |
| 6,130,766 | * 10/2000 | Cao | 359/161 |

OTHER PUBLICATIONS

Morris Katzman, Ed., Laser Satellite Communications, 1987, pp. 190–212, 6.1, by J. M. Lopez and Dr. K. Youg, Laser Beam Pointing Control Acquisition and Tracking Systems.

G. Stephen Mecherle, Free–Space Laser Communication Technologies VI, Jan. 26–28, 1994, The International Society for Optical Engineering, vol. 2123, pp. 200–217.

G. Stephen Mecherle, Free–Space Laser Communication Technologies VII, Feb. 7–8, 1995, The International Society for Optical Engineering, vol. 2381, pp. 72–82.

* cited by examiner

Primary Examiner—Leslie Pascal
Assistant Examiner—Dalzid Singh
(74) Attorney, Agent, or Firm—Vijayalakshmi D. Duraiswamy; Michael W. Sales

(57) ABSTRACT

A system and method for free space optical communication include at least one reconfigurable terminal (30) using dual-wavelength operation for isolation between transmitted and received signals in combination with polarization switching to separate and steer the transmitted and received signals to and from corresponding transmitters (40) and receivers (48). The polarization based switching provides wavelength independent beam steering to facilitate interchanging of wavelengths for transmitted and received signals. A controllable or passive polarization changer (56) such as a wave plate or polarization rotator allows the communication terminal (30) to be reconfigured without also requiring the repositioning and associated precision alignment of beam steering optics (54, 62, 66).

20 Claims, 3 Drawing Sheets

RECONFIGURABLE LASER COMMUNICATIONS TERMINAL

TECHNICAL FIELD

The present invention relates to a reconfigurable laser communications terminal particularly suited for optical intersatellite links.

BACKGROUND ART

Optical intersatellite link terminals are utilized to communicate between two satellites. One of the principal technical challenges in designing communication networks involving these terminals is to isolate the receiver channel within any terminal from back-scatter or any other spurious radiation that may be produced by the transmitted beam originating within the same optical terminal. For typical intersatellite ranges and acceptable transmitter/receiver aperture sizes, the isolation requirement is often greater than 90 dB, i.e. any spurious signal generated by the transmitter beam which can possibly enter the receiver channel must be less than the transmitter beam itself by at least 90 dB.

In communications networks incorporating optical intersatellite links (OISLs), one common isolation approach which achieves acceptable size and weight while also producing the required isolation between transmitted and received beams is to operate the beams at different wavelengths. A dual wavelength OISL network requires (at least) two types of terminals which are characterized by their operating wavelengths. For example, terminals of type A transmit radiation at a first wavelength and receive radiation at a second wavelength, while terminals of type B transmit at the second wavelength and receive at the first wavelength. A successful communication link requires that an A terminal communicate with a B terminal. The operating wavelengths are typically separated by about 5 to 10 nanometers (nm) which is large enough that available receiver bandpass filters can adequately reject spurious transmitter radiation and meet the isolation requirement. This approach offers various advantages, including the fact that the transmit and receive functions can share a common telescope and pointing optics to reduce weight and cost. To separate the transmitted beam from the incoming received beam, a dichroic beamsplitter is used which reflects the first wavelength while transmitting the second wavelength.

A second known isolation method employs polarization-based switching techniques to isolate the transmitted and received beams which operate at the same wavelength but orthogonal polarizations. This approach provides isolation of only about 30 dB to 40 dB depending upon the particular implementation and is therefore not appropriate for many OISL applications which have more stringent isolation requirements.

While physical isolation of the optical paths provides acceptable isolation, this third approach requires separate telescopes and pointing optics and therefore results in greater weight and cost compared to the approaches described above. Likewise, temporal isolation, i.e. transmitting and receiving at different times, represents a fourth approach that may be used to provide sufficient isolation but imposes severe constraints on the communication format that can be used. Furthermore, temporal isolation requires the system to adapt to changes in intersatellite range and is therefore undesirable.

Designers of space-based communications networks recognize that some fraction of the OISL terminals will become inoperable during the desired system lifetime. To compensate, sufficient redundancy should be provided so that the overall system can function acceptably despite the loss of a considerable fraction of the terminals. A typical system design may specify 50% more terminals per satellite than is required to maintain minimum acceptable performance. An implicit assumption when this reliability approach is applied in conjunction with dual-wavelength isolation is that any given satellite will always have enough terminals of the proper type (A or B) to maintain its links with complementing terminals of the opposite type on one or more other satellites. To reduce cost while providing acceptable system redundancy, the terminals of the communication system should be reconfigurable such that an A terminal can convert to a B terminal (and vice versa) upon receipt of an appropriate command from the network controller.

One approach to providing this reconfigurability is to mechanically exchange a dichroic beamsplitter so that the appropriate wavelength for the A or B terminal is directed to the receiver channel and from the transmitter. However, this approach requires complex and costly mechanical and electronic componentry to achieve the precise alignment necessary for the repeated switches between type A and B terminals throughout the life of the satellite network.

SUMMARY OF THE INVENTION

Thus, it is an object of the present invention to provide a reconfigurable communication terminal having acceptable weight, cost, and isolation for use in optical intersatellite links.

Another object of the present invention is to provide a system and method for separating a transmit beam from a receive beam in a dual-wavelength optical communication system which exhibits similar performance characteristics for both types of terminals to facilitate reconfigurability.

A further object of the present invention is to provide a method for reconfiguring an optical communication terminal while reducing or eliminating mechanical motion of optical elements.

Yet another object of the present invention is to provide a polarization-based reconfigurable communication system and method which combine optical paths of the transmit and receive beams while improving isolation.

An additional object of the present invention is to provide a system and method for reconfiguring an optical communication terminal in response to a control command by exchanging transmit and receive signal types.

Another object of the invention is to provide a system and method for reconfiguring an optical communication terminal which reduce or eliminate repositioning of beam steering components.

A system and method for optical communication include at least one reconfigurable terminal using dual-wavelength operation for isolation between transmitted and received signals in combination with polarization switching to separate and steer the transmitted and received signals to and from corresponding receivers and transmitters, respectively. The polarization based switching provides wavelength independent beam steering to facilitate interchanging of wavelengths for transmitted and received signals. A controllable or passive polarization changer such as a wave plate or polarization rotator, in conjunction with selectable or tunable bandpass filters, allow the communication terminal to be reconfigured without also requiring the repositioning and associated precision alignment of beam steering optics.

In one embodiment, an optical communication terminal according to the present invention includes a transmitter for generating an optical signal having a first-polarization and first wavelength and a receiver for receiving an optical signal having a second polarization and second wavelength. A polarization beamsplitter directs optical signals having the first polarization and first wavelength from the transmitter while directing optical signals having the second polarization and second wavelength to the receiver. A reconfigurable polarization changer operable to change polarization of optical signals passing therethrough is responsive to a command signal to select one of a first state in which output signal polarization is changed from the first polarization to a third polarization (while also changing a fourth polarization to the second) and at least a second state in which output signal polarization is changed from the first polarization to the fourth polarization (while also changing the third polarization to the second polarization).

A method for optical communication according to the present invention includes transmitting optical communication signals at a first wavelength and first polarization, and receiving optical communication signals at a second wavelength and second polarization. The transmitted and received signals travel along an optical path passing through at least one optical element common to both transmitted and received signals. The first and second wavelengths are selected to provide a predetermined level of isolation between transmitted and received optical communication signals within a particular communication terminal. The method also includes spatially separating transmitted signals from received signals based on the first and second polarizations but substantially independently of the first and second wavelengths, and selectively reconfiguring the communication terminal by interchanging the first and second wavelengths and polarizations such that optical communication signals are transmitted from the terminal at the second wavelength and second polarization and received by the terminal at the first wavelength and first polarization.

One embodiment of an optical communication system according to the present invention includes a first satellite having a first optical communication terminal transmitting optical signals at a first wavelength with a first polarization and receiving optical signals at a second wavelength and second polarization. At least one additional satellite having a second optical communication terminal transmits optical signals at the second wavelength with the second polarization and receives signals at the first wavelength and the first polarization. At least the first optical communication terminal is selectively reconfigurable to interchange transmitting and receiving wavelengths and polarizations in response to a command signal, preferably without repositioning and/or realignment of any beam steering optics.

The present invention provides a number of advantages for optical communication systems. For example, the present invention provides superior performance as measured by cost, size, weight, complexity, and reliability compared to other approaches. The present invention accomplishes the required optical switching or beam steering function using conventional beamsplitters and avoids repositioning and associated precision alignment of beam steering optics. The present invention may be implemented with commercially available polarization components enabling a low-cost solution to the switching problem while providing reconfigurable communication terminals to improve system flexibility and overall reliability.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
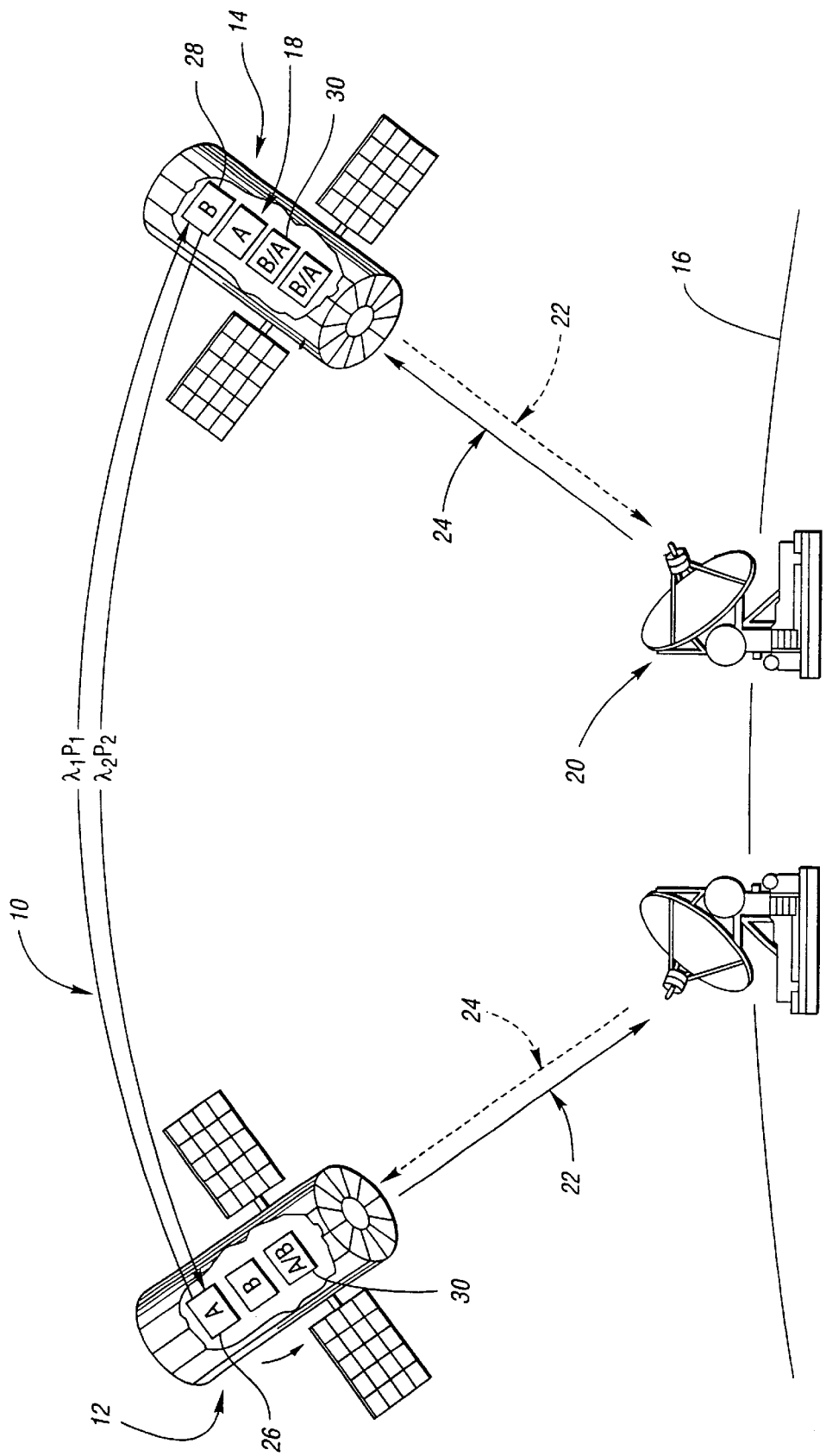
FIG. 1 is a block diagram of an optical satellite communication system according to the present invention.

Referring now to FIG. 1, a block diagram illustrating one application for an optical communication system according to the present invention is shown. As one of ordinary skill in the art will appreciate, the present invention is generally applicable to any free-space optical communication system with one example being a satellite-based communication system as illustrated and described in detail below. Likewise, although the illustrative example provided below is described with reference to communication signals, the present invention is equally applicable to acquisition and tracking systems and/or subsystems which also require transmitting and receiving signals that often utilize common optics and must address the same isolation challenges described above.

Satellite communication system 10 includes a number of satellites 12, 14 in orbit about the Earth 16. Satellites 12, 14 include one or more optical communication terminals 18 which may perform free-space optical communication according to the present invention. Satellites 12, 14 also include directional communication systems for transmitting information to ground station 20 via downlink 22 which is typically an RF link. Likewise, ground station 20 may communicate data including control commands to satellites 12, 14 via uplink 24.

Communication system 10 is preferably a dual-wavelength system which incorporates at least two types of terminals 18 characterized by their selected operating wavelengths. For example, terminals 26, referred to as type "A", transmit radiation at a first wavelength $\lambda_1$ and polarization $P_1$, while receiving radiation at a second wavelength $\lambda_2$ and polarization $P_2$. Complementary terminals 28, referred to as type "B", transmit radiation at the second wavelength $\lambda_2$ and polarization $P_2$ while receiving radiation at the first wavelength $\lambda_1$ and first polarization $P_1$. A successful communication link requires that an "A" terminal communicate with a "B" terminal. The two operating wavelengths are typically separated by 5 to 10 nanometers. This is large enough for readily available receiver bandpass filters to adequately reject transmitter radiation while providing the required isolation, typically 90 dB.

The two satellites preferably transmit and receive communication signals along a common line-of-sight, or communication beam axis, which is illustrated as separate transmit and receive beams in FIG. 1 for clarity and ease of description only. As used throughout this description, a beam or signal is "transmitted" when it leaves the communication terminal and "received" when it arrives at the communication terminal. A transmitter "generates" a signal or beam which has an associated wavelength and polarization. The generated signal or beam passes through various optical elements within the communication terminal, including a polarization changer, such that the transmitted beam is characterized by the same wavelength but a different polarization relative to the generated beam. Likewise, a "received" signal having an associated wavelength and polarization passes through the polarization changer within the communication terminal prior where it is referred to as a "detected" signal or beam which passes to the receiver. Thus, the "detected" beam or signal will have the same wavelength, but a different polarization, relative to the "received" beam which arrives at the communication terminal.

To meet the desired system lifetime, redundant communication terminals may be included to compensate for those terminals which deteriorate or become inoperable during the desired lifetime. This strategy is most prevalent in satellite-based systems since repair or replacement of a terminal is very difficult or impossible. However, a sufficient number of terminals of complementary types must be present to maintain the required links. The present invention provides one or more reconfigurable terminals 30 to reduce the number of required terminals as explained in greater detail below.

As illustrated in FIG. 1, satellite 12 includes a first optical communication terminal 26 which transmits optical signals at a first wavelength $\lambda_1$ with a first polarization $P_1$ and receives optical signals at a second wavelength $\lambda_2$ and second polarization $P_2$. Satellite 14 preferably includes a second optical communication terminal 28 which transmits optical signals at the second wavelength $\lambda_2$ with the second polarization $P_2$. Communication terminal 28 receives signals at the first wavelength $\lambda_1$, with the first polarization $P_1$. Optical communication terminal 30 is selectively reconfigurable to interchange transmitting and receiving wavelengths and polarizations in response to a command signal from ground station 20. Satellite 14 may also include various other optical communication terminals 18 which transmit optical signals at the first wavelength $\lambda_1$ and first polarization $P_1$. Likewise, satellite 12 may also include various other optical communication terminals which transmit optical signals at the second wavelength $\lambda_2$ and second polarization $P_2$.

Figure 2:
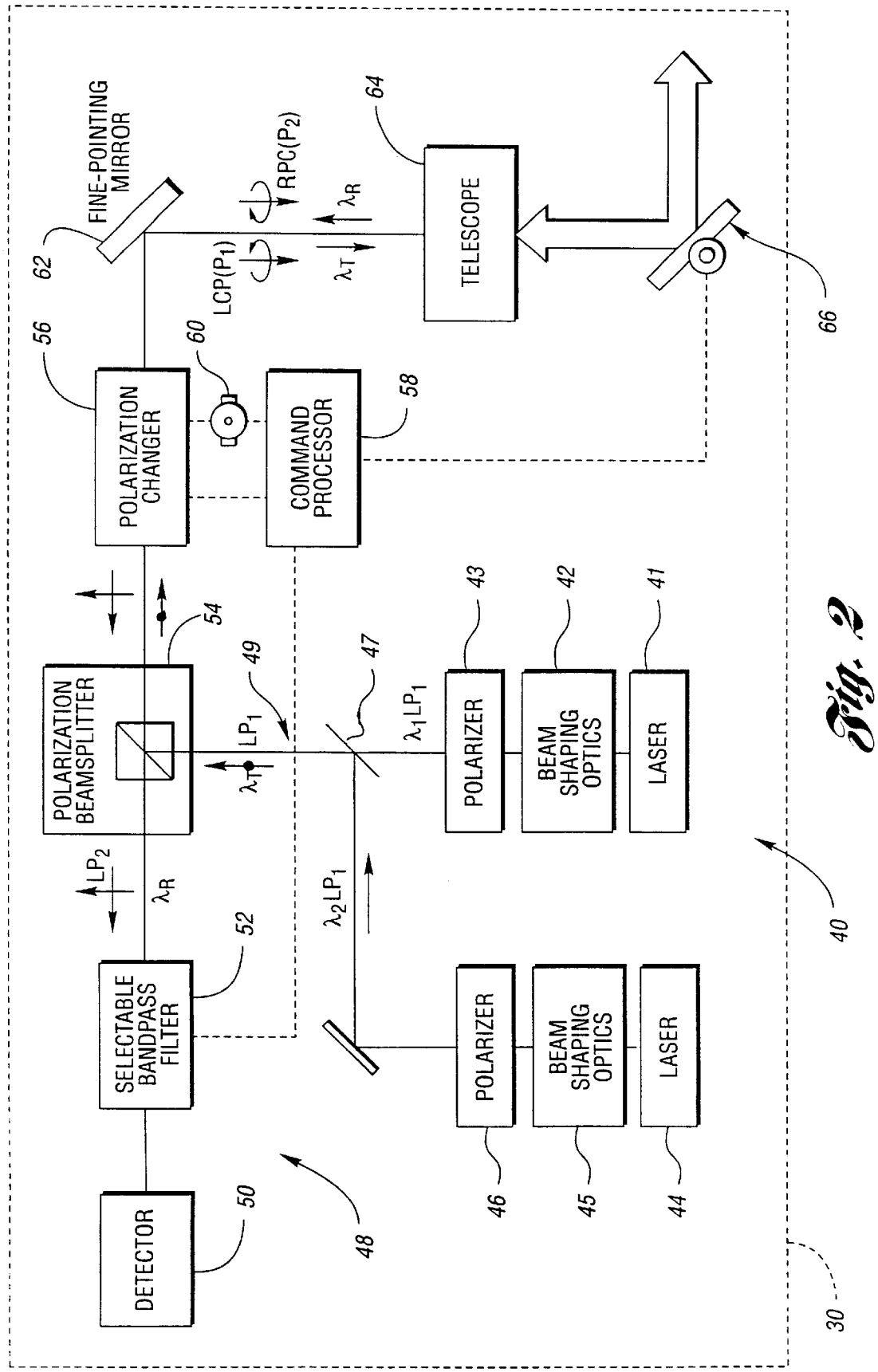
FIG. 2 is a partial block diagram for an optical communication terminal according to the present invention.

Referring now to FIG. 2, a partial block diagram of an optical communication terminal according to the present invention is shown. One of ordinary skill in the art will appreciate that this block diagram includes only those elements which facilitate description of the present invention and that any actual implementation may include additional elements and/or equivalent elements without departing from the spirit or scope of the present invention. Likewise, the present invention may be implemented with discrete commercially available components, custom integrated components, or any combination thereof.

Optical communication terminal 30 includes a transmitter 40 for generating an outbound optical signal having an associated polarization. Transmitter 40 may be implemented by any of a number of known coherent radiation sources with or without associated optics. In this embodiment, transmitter 40 includes a laser assembly 41, beam shaping optics 42, and an optional polarizer 43. In one embodiment, transmitter 40 generates coherent radiation at a first wavelength, such as 1550 nanometers with a first linear polarization ($LP_1$). The transmitting wavelength $\lambda_T$ may be either $\lambda_1$ or $\lambda_2$ depending on whether terminal 30 is a type "A" or "B" terminal, respectively. The first linear polarization is denoted by a dot which represents vertically polarized light, i.e. light polarized perpendicular to the plane of the figure.

For lasers that produce a tunable wavelength selectable in response to a control command, only a single laser is necessary. As an example, for semiconductor lasers, such as those operating within a wavelength range near 1550 nanometers, a convenient method for accomplishing the required wavelength change from $\lambda_1$ to $\lambda_2$ is to change the temperature of the diode laser. Alternatively, if the magnitude of the required temperature change of a diode laser is unacceptable, or if the system incorporates a different type of laser producing a substantially fixed wavelength, transmitter 40 may include a second laser assembly 44, associated beam shaping optics 45 and an optional polarizer 46. Second laser assembly 44 includes a laser operating at a second wavelength, $\lambda_2$. The beams generated by first laser assembly 41 and second laser assembly 44 possess the same polarization state ($LP_1$). A beam combiner 47 directs the two beams along the same optical path 49. A number of approaches are known in the existing art for accomplishing the function of the beam combiner 47. For many types of laser, a grating or a dichroic mirror may be used. For lasers operating near 1550 nanometers, other options well known in the art, including a wavelength division multiplexer (WDM) or a fiber-based optical switch, are also available.

As also illustrated in FIG. 2, terminal 30 includes a receiver 48 for detecting an inbound optical signal having an associated polarization. Receiver 48 includes an appropriate detector 50 and associated optics, such as a selectable bandpass filter 52, which provide the required isolation. Suitable bandpass filters are available in the existing art. For widely spaced wavelengths (e.g. $\lambda_1$ and $\lambda_2$ differing by more than 15 to 20 nanometers), thin-film bandpass filters will suffice, and mechanical switching can be utilized to interchange filters having the required bandpass wavelengths. For narrow wavelength spacing, one can utilize the dielectric-coated Fabry-Perot etalon aligned perpendicular to the beam propagation direction. Since an etalon passes a periodic set of wavelengths, a thin-film filter might be employed in series to eliminate all etalon bandpass wavelengths except the one desired. For highest precision, the etalon might require temperature stabilization to avoid thermally induced drifts in the bandpass wavelength. This same temperature controller can be used to tune the bandpass on the etalon from $\lambda_1$ to $\lambda_2$ thereby achieving the required selectability of the received wavelength without the need for any mechanical switching. Receiver 48 preferably detects optical signals having a second linear polarization ($LP_2$) which is indicated by an arrow perpendicular to the propagation direction and represents horizontal linear polarization.

A polarization beamsplitter 54 within terminal 30 is operable to direct optical signals having the first linear polarization ($LP_1$) from transmitter 40 while directing optical signals having the second linear polarization ($LP_2$) to receiver 48. A reconfigurable polarization changer 56 is operable to change polarization of optical signals passing therethrough.

In one embodiment, polarization changer 56 is responsive to a command signal received from command processor 58 to select one of a first state in which the generated signal polarization is changed from the first linear polarization ($LP_1$) to the first polarization ($P_1$) (while the received signal polarization, $P_2$, is simultaneously changed to the second linear polarization, $LP_2$) and at least a second state in which the generated signal polarization is changed to a second polarization ($P_2$) (where the received signal polarization, $P_1$, is simultaneously changed to the second linear polarization, $LP_2$). In one embodiment of the present invention, the first and second linear polarizations (generated and detected) are orthogonal linear polarizations while the first and second polarizations (transmitted and received) are orthogonal circular polarizations. For example, the first linear polarization (LP$_1$) may be vertically oriented linear polarization while the second linear polarization (LP$_2$) is horizontally oriented linear polarization, or vice versa. In this case, polarization changer 56 would change the first linear polarization (LP$_1$) to a circular polarization (P$_1$) such as left circular polarization (LCP). Likewise, received signals would be right circularly polarized (RCP) and converted to horizontal linearly polarized signals by polarization changer 56. Upon receipt of a command from command processor 58, polarization changer 56 would convert the first linear polarization (LP$_1$) to the second polarization (RCP) rather than the first polarization (LCP). Reconfiguration may be coordinated by the network controller (ground station) so that communicating terminals are of the proper type. Alternatively, autonomous control of the terminal type (gender) may be performed by processors aboard the satellite(s). Preferably, reconfiguration also results in changing the wavelengths associated with the transmitted and received optical signals to provide the predetermined isolation. As such, the selectable bandpass filter 52 would be adjusted to account for the interchanging of transmitted and received wavelengths.

Polarization changer 56 may be implemented by any of a number of known devices which may reversibly control the sense of the polarized beams. For example, a retarder such as a quarter-wave plate may be used in combination with a motor 60 to rotate the quarter-wave plate by 90° about the optical beam axis to select either the first or second polarizations. Alignment tolerances are relatively large and easy to maintain with this approach since a rotating quarter-wave plate (which has plane-parallel faces) will not impose any significant beam steering on the beams passing through it. Alternatively, a non-mechanical approach utilizing an electro-optic crystal may be used. As is known, an electro-optic crystal driven with a DC voltage controlled by command processor 58 may be used to select the appropriate polarization state.

Polarization changer 56 may also be implemented by an active or passive polarization rotator which rotates the output polarization by 45° but maintains linear polarization. The received beam would rotate an additional 45° as is passes back through the polarization changer (rotator) to impart a total rotation of 90° as required. Polarization rotators are well known in the art and are generally made from crystalline quartz cut such that the beam propagates along the crystal optic axis (c-axis). While this alternative offers the advantage of avoiding mechanical motion, it is sensitive to the relative angular rotation along the line-of-sight or optical beam axis between two communication terminals. If the two terminals undergo any relative angular rotation about the line-of-sight, that angular rotation introduces a loss into the link. Specifically, if the rotation angle is $\theta$, the loss will be $\sin^2\theta$. In contrast, the quarter-wave plate implementation is insensitive to the relative angular alignment of the terminals about the line-of-sight so that there would be no loss attributable to the angular orientation.

Various other beam steering optics such as fine-pointing mirror 62, telescope 64, and gimbaled steering mirror 66 may be used for acquisition, tracking, and communications alignment purposes. As illustrated in FIG. 2, the transmitted and received optical communication signals travel along an optical path passing through a number of optical elements common to both, including polarization beam splitter 54, polarization changer 56, fine-pointing mirror 62, telescope 64, and gimbaled steering mirror 66. This results in reduced cost, complexity, and weight. As such, the present invention utilizes a dual-wavelength approach to achieve the desired isolation between transmitted and received signals, but uses polarization-based switching (which is essentially independent of the wavelength) to separate the two beams such that they can share common output and pointing optics. This is possible due to the fact that a single set of polarization elements will function satisfactorily over a 10 to 20 nanometer range of wavelengths near 1550 nanometers. This obviates the need to exchange any beam steering elements when the transmitted and received beams interchange wavelengths, i.e. when the communication terminal is reconfigured from a type "A" to a type "B" terminal. As such, once the polarization beamsplitter is aligned, it does not need to be moved to accommodate different choices of operating wavelengths. Optical elements which may be repositioned are only those which do not affect the beam steering and have relatively large tolerances with respect to alignment. Thus, the sensitive adjustment and alignments need to be made only once during final assembly and testing rather than relying on an extremely precise mechanical motion to maintain alignment during repeated switching operations.

Figure 3:
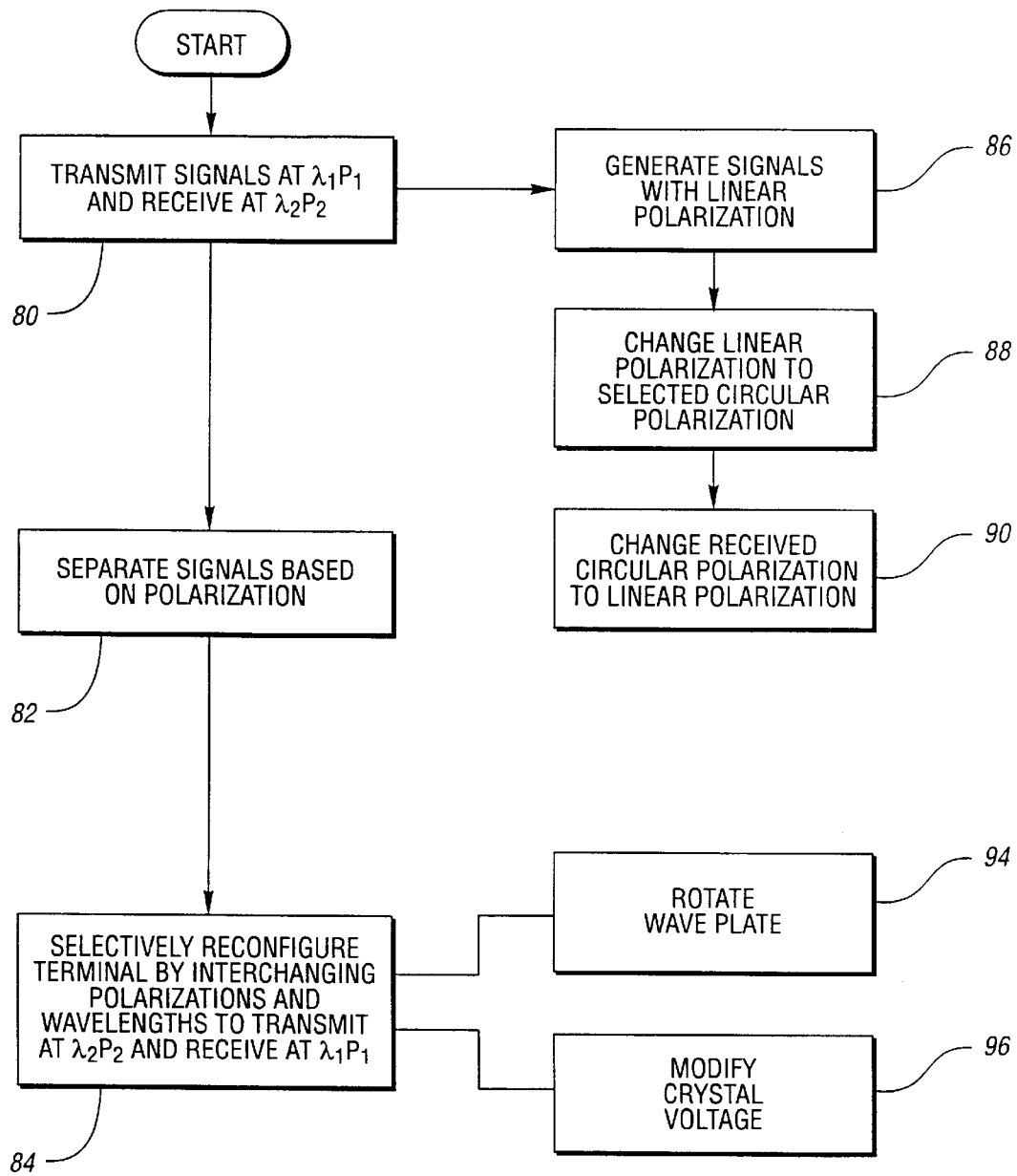
FIG. 3 is a flow chart illustrating a method for intersatellite optical communication according to the present invention.

Referring now to FIG. 3, a flowchart illustrating a method for optical communication according to the present invention is shown. As one of ordinary skill in the art will recognize, the functions or steps represented by the flowchart are not necessarily performed in sequence and one or more may be performed simultaneously or substantially simultaneously. Block 80 represents transmitting optical communication signals at a first wavelength ($\lambda_1$) and first polarization (P$_1$) and receiving optical communication signals at a second wavelength ($\lambda_2$) and second polarization (P$_2$) Preferably, the transmitted and received signals travel along an optical path within the communication terminal passing through at least one optical element common to both. Also preferably, the first and second wavelengths are selected to provide a predetermined level of isolation between transmitted and received optical communication signals within a particular communication terminal. As represented by block 82, the transmitted and received signals are separated based on the first and second polarizations but substantially independently of the first and second wavelengths. As explained above, this is accomplished using a polarization beam splitter with suitable performance characteristics over the wavelengths of interest in conjunction with a polarization changer.

Block 84 represents selectively reconfiguring the communication terminal by interchanging the first and second wavelengths and polarizations such that optical communication signals are transmitted at the second wavelength and second polarization and received at the first wavelength and first polarization. As also described with reference to FIG. 2, block 80 of FIG. 3 may include generating signals with a first wavelength and first linear polarization as represented by block 86. In the example illustrated in FIG. 2, the first and second linear polarizations (corresponding to the generated and detected beams) are orthogonal linear polarizations whereas the first and second polarizations (corresponding to the transmitted and received beams) are orthogonal circular polarizations. As such, the polarization is changed from the first linear polarization to a selected one of the first or second (circular) polarizations as represented by block 88. Likewise, the polarization of the received signal will be changed from either the first or second (circular) polarization to the second linear polarization as represented by block 90. As described above, depending upon the particular polarization changer utilized, a "change" in polarization may include rotation of a linear polarization as well as changing from a linear polarization to a circular polarization. As such, references to linear and circular polarizations in the text and drawings are not intended to limit the scope of the invention but rather to improve the clarity of the description.

The optical communication terminal may be selectively reconfigured by interchanging the transmitting and receiving polarizations and wavelengths. Transmitting and receiving polarizations may be changed by rotating a wave plate as represented by block 94. Alternatively, this step may be performed by modifying the voltage applied to an appropriate electro-optic crystal. The transmitting and receiving wavelengths (corresponding to the generated beam and detected beam, respectively) may be interchanged by tuning the transmitter or selecting another source within the transmitter in conjunction with selecting an appropriate bandpass filter within the receiver.

While the best mode contemplated for practicing the invention has been described in detail, those familiar with the art to which this invention relates will recognize various alternative designs and embodiments for practicing the invention as defined by the following claims.

What is claimed is:

1. An optical communication terminal comprising:
   a transmitter for transmitting an optical signal having a first polarization;
   a receiver for receiving an optical signal having a second polarization;
   a polarization beamsplitter operable to direct optical signals having the first polarization from the transmitter while directing optical signals having the second polarization to the receiver;
   a filter having a selectable pass band for filtering optical signals directed by the polarization beamsplitter to the receiver;
   a reconfigurable polarization changer operable to change polarization of optical signals passing therethrough, the polarization changer responsive to a command signal to select one of a first state in which output signal polarization is changed to a third polarization and at least a second state in which output signal polarization is changed to a fourth polarization.

2. The terminal of claim 1 wherein the first and second polarizations are orthogonal linear polarizations and the third and fourth polarizations are orthogonal circular polarizations.

3. The terminal of claim 1 wherein the reconfigurable polarization changer comprises a wave plate.

4. The terminal of claim 3 wherein the reconfigurable polarization changer further comprises a positioning motor for rotating the wave plate in response to the command signal.

5. The terminal of claim 1 wherein the reconfigurable polarization changer comprises an electro-optic crystal.

6. The terminal of claim 1 wherein the reconfigurable polarization changer comprises a 45° polarization rotator.

7. The terminal of claim 6 wherein the polarization rotator is a passive polarization rotator.

8. The terminal of claim 1 further comprising common pointing optics and telescopes for directing transmitted and received optical signals along a common path between the polarization beamsplitter and another terminal.

9. A method for optical communication comprising:
   transmitting optical communication signals at a first wavelength and first polarization and receiving optical communication signals at a second wavelength and second polarization along an optical path passing through at least one optical element common to both transmitted and received signals, the first and second wavelengths selected in conjunction with a selectable bandpass filter in a receiving channel to provide a predetermined level of isolation between transmitted and received optical communication signals within a particular communication terminal;
   separating transmitted signals from received signals based on the first and second polarizations but substantially independently of the first and second wavelengths; and
   selectively reconfiguring the communication terminal by interchanging the first and second wavelengths and polarizations such that optical communication signals are transmitted at the second wavelength and second polarization and received at the first wavelength and first polarization.

10. The method of claim 9 wherein the step of transmitting comprises:
    generating the optical communication signals at a first wavelength and a third polarization and changing the third polarization to a selected one of the first and second polarizations; and
    wherein the step of separating comprises separating transmitted signals from received signals based on the third polarization.

11. The method of claim 9 wherein the step of transmitting comprises:
    changing the second polarization of a received communication signal to a fourth polarization and
    detecting the optical communication signals at the second wavelength and fourth polarization; and
    wherein the step of separating comprises separating received signals from transmitted signals based on the fourth polarization.

12. The method of claim 9 wherein the at least one optical element is a wave plate and wherein the step of selectively reconfiguring the communication terminal comprises rotating the wave plate.

13. The method of claim 9 wherein the step of transmitting comprises:
    generating the optical communication signals at a first wavelength and a third polarization;
    changing the third polarization to a selected one of the first and second polarizations while simultaneously changing the polarization of received signals from an opposite one of the selected first and second polarizations to a fourth polarization; and
    detecting the optical communication signals at the second wavelength and the fourth polarization.

14. The method of claim 9 wherein the step of selectively reconfiguring is performed without repositioning of any optics associated with redirection of the optical communication signals.

15. A satellite optical communication system comprising:
    a first satellite having a first optical communication terminal transmitting optical signals at a first wavelength with a first polarization and receiving optical signals at a second wavelength and second polarization; and
    at least a second satellite having a second optical communication terminal transmitting optical signals at the second wavelength with the second polarization and receiving signals at the first wavelength with the first polarization, wherein at least the first optical communication terminal is selectively reconfigurable to interchange transmitting and receiving wavelengths and polarizations in response to a command signal.

16. The satellite optical communication system of claim 15 wherein the second satellite further comprises:
a third optical communication terminal transmitting optical signals at the first wavelength and first polarization.

17. The satellite optical communication system of claim 15 wherein the first satellite further comprises:
a transmitter for generating coherent radiation at the first wavelength and having a first linear polarization;
a receiver for receiving coherent radiation at the second wavelength and having a second linear polarization substantially perpendicular to the first linear polarization;
a polarization beamsplitter for directing incident coherent radiation having the first linear polarization from the transmitter while directing incident coherent radiation having the second linear polarization to the receiver, substantially independent of the wavelength of the incident coherent radiation; and
a controllable polarization changer for selectively modifying the first linear polarization to the first polarization while in a first state and modifying the first linear polarization to the second polarization while in a second state.

18. The satellite optical communication system of claim 15 wherein the second optical communication terminal is selectively reconfigurable to interchange transmitting and receiving wavelengths and polarizations in response to a command signal.

19. The satellite optical communication system of claim 15 wherein the first optical communication terminal is selectively reconfigurable to interchange transmitting and receiving wavelengths and polarizations in response to a command signal without repositioning any optical beam steering elements.

20. The satellite optical communication system of claim 15 wherein the first satellite comprises a plurality of optical communication terminals.

* * * * *